United States Patent
Wu et al.

(10) Patent No.: US 10,261,178 B2
(45) Date of Patent: Apr. 16, 2019

(54) WIRELESS NETWORK BASED METHOD FOR DETECTING PRESENCE OF METAL

(71) Applicant: SHENZHEN UNIVERSITY, Shenzhen, Guangdong Province (CN)

(72) Inventors: Kaishun Wu, Shenzhen (CN); Yuanchao An, Shenzhen (CN); Zhong Ming, Shenzhen (CN)

(73) Assignee: SHENZHEN UNIVERSITY (CN)

( * ) Notice: Subject to any disclaimer, the term of this patent is extended or adjusted under 35 U.S.C. 154(b) by 494 days.

(21) Appl. No.: 14/932,867

(22) Filed: Nov. 4, 2015

(65) Prior Publication Data
US 2016/0274230 A1 Sep. 22, 2016

(30) Foreign Application Priority Data
Mar. 16, 2015 (CN) .......................... 2015 1 0115135

(51) Int. Cl.
*G01S 7/41* (2006.01)
*G01S 13/88* (2006.01)
*G01S 13/00* (2006.01)

(52) U.S. Cl.
CPC ............ *G01S 13/887* (2013.01); *G01S 7/412* (2013.01); *G01S 13/003* (2013.01)

(58) Field of Classification Search
CPC ...... G01S 13/887; G01S 13/003; G01S 13/04; G01S 13/56; G01S 7/41–7/418
See application file for complete search history.

(56) References Cited

U.S. PATENT DOCUMENTS

| 8,319,678 B2 * | 11/2012 | Weiss | G01S 13/003 |
| | | | 342/175 |
| 9,019,148 B1 * | 4/2015 | Bikhazi | G01S 13/56 |
| | | | 342/28 |
| 9,316,732 B1 * | 4/2016 | Mohamadi | G01S 7/411 |

(Continued)

FOREIGN PATENT DOCUMENTS

| WO | WO-2012027317 A1 * | 3/2012 | ........... G08B 13/248 |
| WO | WO-2014120289 A1 * | 8/2014 | ............. G01S 7/025 |

*Primary Examiner* — Matthew M Barker
(74) *Attorney, Agent, or Firm* — PROI Intellectual Property US

(57) ABSTRACT

A wireless network based method for detecting carrying of metal, comprising: installing a wireless signal transmitting device and a wireless signal receiving device indoors; continuously transmitting to the surrounding, by the wireless signal transmitting device, wireless electromagnetic wave signals; continuously receiving, by the wireless signal receiving device, the wireless electromagnetic wave signals; continuously performing, through a signal abnormity detection system, abnormity analysis to the received wireless electromagnetic wave signals, and if any abnormality is determined, performing further analysis in the next step S5 to wireless electromagnetic wave signals within an abnormal waveband; and S5: extracting, through a date feature analysis system, a feature value of the wireless electromagnetic wave signals within the abnormal waveband, comparing and matching the feature value with features stored in an abnormal feature library, and if the feature of the wireless electromagnetic wave signals matches the feature of metal successfully, triggering an alarm device.

10 Claims, 2 Drawing Sheets

(56) References Cited

U.S. PATENT DOCUMENTS

| | | | | |
|---|---|---|---|---|
| 2008/0211711 A1* | 9/2008 | Mostov | .................. | G01V 8/005 |
| | | | | 342/179 |
| 2011/0181300 A1* | 7/2011 | Bowring | ................. | G01S 7/411 |
| | | | | 324/637 |
| 2012/0229322 A1* | 9/2012 | Mostov | .................. | G01S 7/024 |
| | | | | 342/22 |
| 2012/0256786 A1* | 10/2012 | Bowring | ................. | G01S 7/024 |
| | | | | 342/188 |
| 2013/0106643 A1* | 5/2013 | Wahlquist | ............... | G01S 13/04 |
| | | | | 342/27 |
| 2015/0276920 A1* | 10/2015 | Kim | ........................ | G01S 7/025 |
| | | | | 342/188 |
| 2016/0097852 A1* | 4/2016 | Bowring | ................. | G01S 7/411 |
| | | | | 342/22 |
| 2016/0209506 A1* | 7/2016 | Longstaff | ................ | G01S 7/024 |
| 2016/0241348 A1* | 8/2016 | Zirwas | .................. | G01S 13/003 |
| 2017/0315226 A1* | 11/2017 | Bowring | ................. | G01S 13/08 |

\* cited by examiner

WIRELESS NETWORK BASED METHOD FOR DETECTING PRESENCE OF METAL

CROSS REFERENCE TO RELATED APPLICATION

The present application claims priority to Chinese Patent Application CN 2015 101 151 35.7 filed on Mar. 16, 2015.

FIELD OF THE INVENTION

The present invention relates to a method for detecting the presence of metal, in particular to a wireless network based method for detecting the presence of metal.

BACKGROUND OF THE INVENTION

At present, there are following well-known metal detection ways. One is item identification based on the X-ray penetration technology, that is, a diagnostic image is generated using radiography and other technologies to identify items such as metal. X-ray, as one of rays such as ionizing radiation dangerous to the human body, is mainly applied in the field of medical examination. At present, this detection way is employed in the available luggage security inspection instruments. Another way is detection of the presence of metal by detecting the impact of metal to the electromagnetic field by utilizing the principle of electromagnetic induction. At present, a global leading hand-held metal detector may detect the presence of gold of 0.13 g. The detection of the presence of ferrous metals is more difficult than that of nonferrous metals, because the induction of ferrous metals to a magnetic field is quite low.

For the first detection way, the implementation cost is quite high; it is difficult to transport and move the resulting products as they are huge and bulky; and the X-ray is seriously harmful to the human body. Whereas, the second detection way by utilizing the principle of electromagnetic induction requires short-distance detection, although it is lower in cost and less harmful to the human body than the first detection way. Hand-held instruments of this type requires detection close to the human body, while fixed door-shaped instruments of this type are not flexible for movement and the detection scope is narrow. Therefore, for both ways, the cooperation of a person to be detected is required, and the completion of corresponding actions or arrival at a specified position is required. The scope and speed of detection is greatly limited.

SUMMARY OF THE INVENTION

The technical problem to be solved in the present invention is to provide a wireless network based method for detecting the presence of metal, with advantages of easy deployment, low cost and no injury to the human body.

In view of this, the present invention provides a wireless network based method for detecting the presence of metal, including the following steps of:

S1: installing a wireless signal transmitting device and a wireless signal receiving device indoors, the wireless signal receiving device being installed within the coverage of wireless signals transmitted by the wireless signal transmitting device;

S2: continuously transmitting to the surrounding, by the wireless signal transmitting device, wireless electromagnetic wave signals;

S3: continuously receiving, by a wireless signal receiving device closer to the wireless signal transmitting device transmitting wireless signals at present, wireless electromagnetic wave signals, the received wireless electromagnetic wave signals comprising wireless electromagnetic wave signals transmitted by the wireless signal transmitting device and wireless electromagnetic wave signals reflected by surrounding walls and indoor items.

S4: continuously performing, through a signal abnormity detection system included in the wireless signal receiving device, abnormity analysis to the received wireless electromagnetic wave signals, and if any abnormality is determined after analysis, performing further analysis in S5 to wireless electromagnetic wave signals within an abnormal waveband;

S5: extracting, through a date feature analysis system, a feature value of the wireless electromagnetic wave signals within the abnormal waveband, comparing and matching the feature value with features stored in an abnormal feature library, and if the feature of the wireless electromagnetic wave signals matches the feature of metal successfully, triggering an alarm device; and S6: transmitting alarm signals to related personnel after the alarm device is triggered; and wherein, abnormal feature library is a signal feature library formed after the wireless electromagnetic wave signals are reflected by abnormal items, the abnormal feature library being set in advance according to abnormal items selected by a user, signals, generated from reflection of the wireless electromagnetic wave signals by metal items, are defined as wireless electromagnetic wave signals within an abnormal waveband.

In the present invention, the detection of metal items is performed by using wireless electromagnetic wave signals, and the reflective feature of the wireless electrometric wave signals is analyzed and judged according to the metal items, so that a long-distance and easy-deployment metal detection method is achieved. The working process of the present invention is as follows: wireless electromagnetic wave signals are transmitted by one or more wireless signal transmitting device to the surrounding and then reflected when arriving at a metal surface, and the reflected wireless electromagnetic wave signals are received by a wireless signal receiving device closer to the wireless signal transmitting device; then, the wireless signal receiving device analyzes the received data, and if determining that there is abnormality in the channel state information of the received wireless electromagnetic wave signals, i.e., CSI abnormality, transfers data within an abnormal fluctuation interval to a data feature analysis system for analysis; the data feature analysis system extracts the received data within the abnormal fluctuation interval as a feature value, matches the extracted feature value with an abnormal feature library, and if they are matched successfully, triggers an alarm device which informs relevant staff.

As a further improvement of the present invention, there is at least one wireless signal transmitting terminal and at least one wireless receiving terminal; and an angle between a line of the wireless signal transmitting device and an item to be detected and a line of the wireless signal receiving device and the item to be detected is not greater than 180°.

As the wireless signals transmitted by the wireless signal transmitting device are radio waves, a higher frequency results in a higher accuracy of detection, and the detection scope increases as the power of the transmitting device increases. The wireless signal receiving device is located close to the wireless signal transmitting device, and an angle between a line of the wireless signal transmitting device and an item to be detected and a line of the wireless signal receiving device and the item to be detected is within 180°, which ensures better effects and facilitates the reception of electromagnetic waves reflected by metal items. A person to be detected may move within the coverage of the wireless signals, because the reflectivity of metal items to electromagnetic wave signals is higher than that of other substances, and signals reflected by metal items show a signal feature different in intensity from other substances. Based on this principle, the present invention realizes abnormality discrimination.

As a further improvement of the present invention, in S4, the abnormity analysis is analysis of channel state information of the received wireless electromagnetic wave signals. The channel state information is CSI in short.

As a further improvement of the present invention, in S4, performing abnormity analysis to wireless electromagnetic wave signals comprises the following steps of:

S41: collecting initial channel state information data based on the multi-input multi-output technology, the initial channel state information data comprising CSI data of M subcarriers in N spatial streams, where the N and M are natural numbers greater than 1;

S42: for multiple spatial flows, calculating an average of CSI values of N continuous subcarriers at a same time point, and using the average as the channel state information, where N is a natural number greater than 1 and less than M; and S43: determining a signal as one reflected by metal if the channel state information exceeds a preset threshold, setting the channel state information as abnormal information, transferring CSI data of N continuous subcarriers from this abnormal time to the following time T to the data feature analysis system. The time T may be customized according to the actual demands of a user, for example, set as 1 minute.

As a further improvement of the present invention, in S5, extracting the feature value comprises performing analysis and extraction to peak number of the channel state information data, when a peak occurs, frequency at which a peak occurs and CSI average intensity to obtain target matched data of an abnormal feature value.

As a further improvement of the present invention, S5 comprises the following steps of:

S51: analyzing, by the data feature analysis system, the peak number of the channel state information data, when a peak occurs, the frequency at which a peak occurs and the CSI average intensity transmitted from S43, and using these data as the target matched data;

S52: establishing a feature model of a training sample, the training sample using an abnormal feature value resulted from changes in the channel state information caused by the presence of different items within a set space as the abnormal feature library;

S53: mapping the target matched data determined in S51 to the feature model of the abnormal feature library in S52, for the purpose the separation of a target item to be detected; and S54: transferring an alarm instruction to the alarm device if an expected result is obtained after the match mapping in S53.

As a further improvement of the present invention, a mapping algorithm in S53 combines three strategies of KNN, SVM and decision tree; and it is determined that the wireless electromagnetic wave signals detected within time T are impacted by metal if there is one abnormal feature value matched with the target matched data successfully, and an alarm instruction in this case is transmitted to the alarm device.

As a further improvement of the present invention, the data feature analysis system and the wireless signal receiving device are integrated in a same system, or the date feature analysis system is installed in an application server outside the wireless signal receiving device; and data transmission is performed, via a data transmission medium, between the data feature analysis system and the wireless signal receiving device, when the data feature analysis system is installed in an application server outside the wireless signal receiving device.

As a further improvement of the present invention, the alarm device, which stays in a standby state before receiving an alarm instruction and enters an operating state when an alarm instruction arrives, informs relevant staff by at least one of playing music, flashing, whistling or alerting with text.

As a further improvement of the present invention, the alarm device is integrated into the data feature analysis system, or the alarm device is separately placed in an individual application server.

Compared with the prior art, the present invention has the following beneficial effects. The detection of metal items is performed by using wireless electromagnetic wave signals, and the reflective feature of the wireless electrometric wave signals is analyzed and judged according to the metal items, so that a long-distance and easy-deployment metal detection method is achieved. The present invention has the advantages of easy deployment, low cost and no injury to the human body; and the detection scope is increased greatly, and the detection speed is improved.

DETAILED DESCRIPTION OF THE PREFERRED EMBODIMENTS

The preferred embodiments of the present invention will be further described below in detail with reference to the accompanying drawings.

Figure 1:
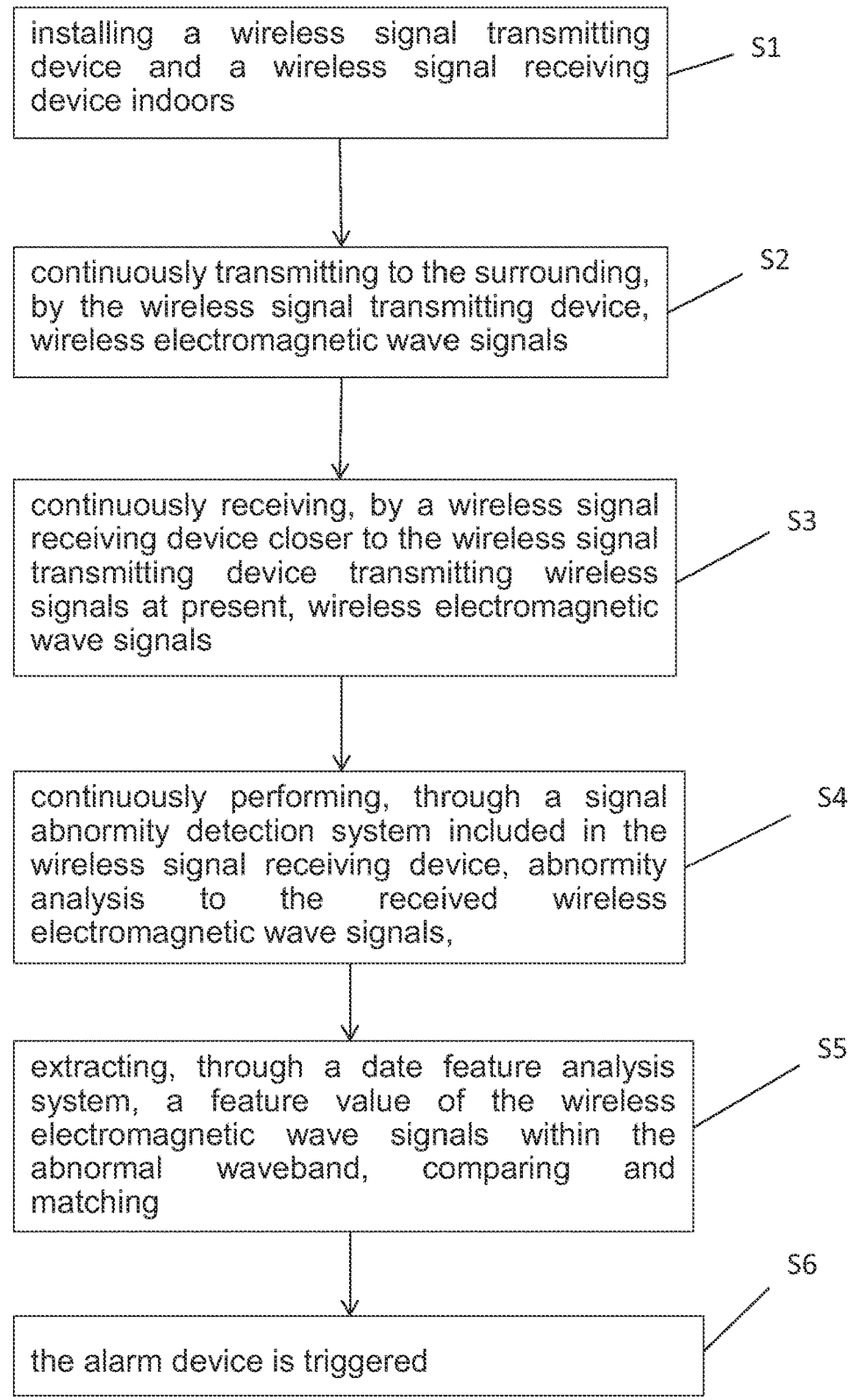
FIG. 1 is a working flowchart according to an embodiment of the present invention.

As shown in FIG. 1, the embodiment provides a wireless network based method for detecting the presence of metal, comprising the following steps of:

S1: installing a wireless signal transmitting device and a wireless signal receiving device indoors, the wireless signal receiving device being installed within the coverage of wireless signals transmitted by the wireless signal transmitting device;

S2: continuously transmitting to the surrounding, by the wireless signal transmitting device, wireless electromagnetic wave signals;

S3: continuously receiving, by a wireless signal receiving device closer to the wireless signal transmitting device transmitting wireless signals at present, wireless electromagnetic wave signals, the received wireless electromagnetic wave signals comprising wireless electromagnetic wave signals transmitted by the wireless signal transmitting device and wireless electromagnetic wave signals reflected by surrounding walls and indoor items.

S4: continuously performing, through a signal abnormity detection system included in the wireless signal receiving device, abnormity analysis to the received wireless electromagnetic wave signals, and if any abnormality is determined after analysis, performing further analysis in S5 to wireless electromagnetic wave signals within an abnormal waveband;

S5: extracting, through a date feature analysis system, a feature value of the wireless electromagnetic wave signals within the abnormal waveband, comparing and matching the feature value with features stored in an abnormal feature library, and if the feature of the wireless electromagnetic wave signals matches the feature of metal successfully, triggering an alarm device; and S6: transmitting alarm signals to related personnel after the alarm device is triggered; and wherein, abnormal feature library is a signal feature library formed after the wireless electromagnetic wave signals are reflected by abnormal items, the abnormal feature library being set in advance according to abnormal items selected by a user, signals, generated from reflection of the wireless electromagnetic wave signals by metal items, are defined as wireless electromagnetic wave signals within an abnormal waveband.

In the present invention, the detection of metal items is performed by using wireless electromagnetic wave signals, and the reflective feature of the wireless electrometric wave signals is analyzed and judged according to the metal items, so that a long-distance and easy-deployment metal detection method is achieved. The working process of the present invention is as follows: wireless electromagnetic wave signals are transmitted by one or more wireless signal transmitting device to the surrounding and then reflected when arriving at a metal surface, and the reflected wireless electromagnetic wave signals are received by a wireless signal receiving device closer to the wireless signal transmitting device; then, the wireless signal receiving device analyzes the received data, and if determining that there is abnormality in the channel state information of the received wireless electromagnetic wave signals, i.e., CSI abnormality, transfers data within an abnormal fluctuation interval to a data feature analysis system for analysis; the data feature analysis system extracts the received data within the abnormal fluctuation interval as a feature value, matches the extracted feature value with an abnormal feature library, and if they are matched successfully, triggers an alarm device which informs relevant staff.

In the embodiment, there is at least one wireless signal transmitting terminal and at least one wireless receiving terminal; and an angle between a line of the wireless signal transmitting device and an item to be detected and a line of the wireless signal receiving device and the item to be detected is not greater than 180°. As the wireless signals transmitted by the wireless signal transmitting device are radio waves, a higher frequency results in a higher accuracy of detection, and the detection scope increases as the power of the transmitting device increases. The wireless signal receiving device is located close to the wireless signal transmitting device, and an angle between a line of the wireless signal transmitting device and an item to be detected and a line of the wireless signal receiving device and the item to be detected is within 180°, which ensures better effects and facilitates the reception of electromagnetic waves reflected by metal items. A person to be detected may move within the coverage of the wireless signals, because the reflectivity of metal items to electromagnetic wave signals is higher than that of other substances, and signals reflected by metal items show a signal feature different in intensity from other substances. Based on this principle, the present invention realizes abnormality discrimination.

In the embodiment, in S4, the abnormity analysis is analysis of channel state information of the received wireless electromagnetic wave signals. The channel state information is CSI in short. In S4, performing abnormity analysis to wireless electromagnetic wave signals preferably comprises the following steps of:

S41: collecting initial channel state information data based on the multi-input multi-output technology, the initial channel state information data comprising CSI data of M subcarriers in N spatial streams, where the N and M are natural numbers greater than 1;

S42: for multiple spatial flows, calculating an average of CSI values of N continuous subcarriers at a same time point, and using the average as the channel state information, where N is a natural number greater than 1 and less than M; and S43: determining a signal as one reflected by metal if the channel state information exceeds a preset threshold, setting the channel state information as abnormal information, transferring CSI data of N continuous subcarriers from this abnormal time to the following time T to the data feature analysis system.

In the embodiment, in S5, extracting the feature value comprises performing analysis and extraction to peak number of the channel state information data, when a peak occurs, frequency at which a peak occurs and CSI average intensity to obtain target matched data of an abnormal feature value. S5 preferably comprises the following steps of:

S51: analyzing, by the data feature analysis system, the peak number of the channel state information data, when a peak occurs, the frequency at which a peak occurs and the CSI average intensity transmitted from S43, and using these data as the target matched data;

S52: establishing a feature model of a training sample, the training sample using an abnormal feature value resulted from changes in the channel state information caused by the presence of different items within a set space as the abnormal feature library;

S53: mapping the target matched data determined in S51 to the feature model of the abnormal feature library in S52, for the purpose the separation of a target item to be detected; and S54: transferring an alarm instruction to the alarm device if an expected result is obtained after the match mapping in S53.

In the embodiment, a mapping algorithm in S53 combines three strategies of KNN, SVM and decision tree; and it is determined that the wireless electromagnetic wave signals detected within time T are impacted by metal if there is one abnormal feature value matched with the target matched data successfully, and an alarm instruction in this case is transmitted to the alarm device.

In the embodiment, the data feature analysis system and the wireless signal receiving device are integrated in a same system, or the date feature analysis system is installed in an application server outside the wireless signal receiving device; and data transmission is performed, via a data transmission medium, between the data feature analysis system and the wireless signal receiving device, when the data feature analysis system is installed in an application server outside the wireless signal receiving device.

In the embodiment, the alarm device, which stays in a standby state before receiving an alarm instruction and enters an operating state when an alarm instruction arrives, informs relevant staff by at least one of playing music, flashing, whistling or alerting with text. The alarm device is integrated into the data feature analysis system, or the alarm device is separately placed in an individual application server.

In practices, the abnormal fluctuation detection and abnormality analysis of metal in the embodiment may be both implemented in an application server. Preferably, the wireless signal transmitting device is a wireless router and the wireless signal receiving device is a wireless card. According to this method, based on a radio wave propagation mechanism, a correlation is established between wireless signals and the material of items carried in the human body. The change in the wireless signals, resulted from the change in the material of items carried in the human body, may be analyzed just by using existing domestic wireless network equipment. It is judged whether a carried item is made of metal and an alarm is triggered if it is. In the embodiment, a multi-antenna router may be cooperated with a multi-antenna wireless card. The multi-antenna router serves as the wireless signal transmitting device and the multi-antenna wireless card serves as the wireless signal receiving device. Further, the impact of the ambient factors to the detection of the presence of metal is reduced, and the accuracy of detection of the presence of metal items is greatly improved.

In the embodiment, there is one or at least two wireless signal transmitting devices and one or at least two wireless receiving devices. In the embodiment, wireless signals are transmitted and received by a plurality of antennas. In the embodiment, the used wireless card may receive channel state information. Preferably, there are two or three wireless signal transmitting devices and two or three wireless signal receiving devices.

For example, within the detected environment, there are two wireless signal transmitting devices, respectively, a first transmitter and a second transmitter; and two wireless signal receiving devices respectively, a first receiving terminal and a second receiving terminal, wherein the first receiving terminal receives CSI (channel state information) from the first transmitter, CSI being the channel attribute of a communication link in the field of wireless communication and being indicative of a fading factor of a signal in each transmission path; and the second receiving terminal receives CSI from the second transmitter. Within the detected environment, a person to be detected is not required to equip with any additional equipment. In the embodiment, the body of a person to be detected will be detected by using the CSI received by the two wireless signal receiving devices, in order to judge whether the person to be detected carries any item made of metal or not.

Figure 2:
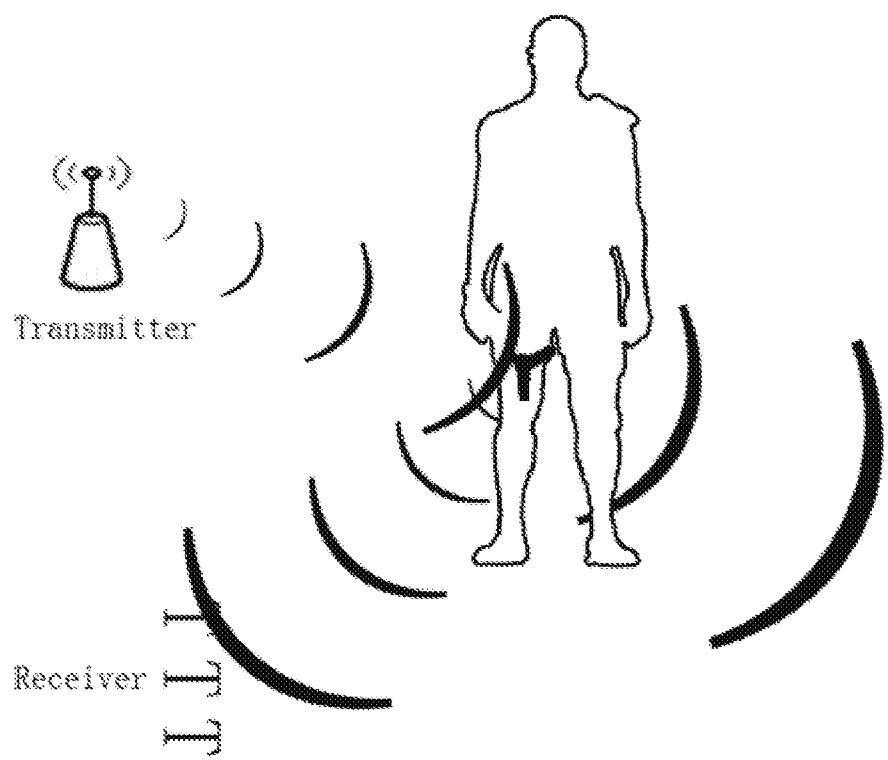
FIG. 2 is a hardware constitution and signal transmission diagram according to an embodiment of the present invention.

In order to establish a correlation between wireless signals and human actions, in the embodiment, the CSI of the wireless network is used as an indicator. CSI may be indicative of a propagation path of a signal under the combined impact of time delay, amplitude attenuation and phase shift. Based on a radio propagation model in an indoor environment, a correlation between CSI and human actions is established in the embodiment. In a specific environment (for example, a room), there is a primary propagation path and a plurality of reflection paths produced due to the impact of the ambient environment (ceiling, floor and walls). When a person to be detected stays in this room, part of radio signals travel through the person to be detected, and part of radio signals are absorbed by the person to be detected. Thus, the presence of human body may weaken the intensity of wireless signals. Whereas, items made of metal may significantly reflect wireless electromagnetic wave signals and the amount of absorption by such items may be ignored with respect to the amount of absorption by human body. If metal is among the human body, the wireless AP and the wireless card, as shown in FIG. 2 which is a hardware constitution and signal transmission diagram for detection of the presence of metal according to the embodiment, the radio signals reflected by metal will be directly received by the wireless card so that the received radio signals received by the wireless card will be enhanced accordingly; furthermore, the intensity of radio signals varies due to different position of metal and different angle of reflection. When metal is on the other side of the human body, i.e., on the back of the human body, part of radio signals traveling through the human body will be reflected by metal, and the radio signals reflected by metal will travel through the human body and are then absorbed by the wireless card, so that the received radio signals received by the wireless card will be enhanced accordingly. However, the degree of enhancement is lower than that of the former position. In the present invention, by orthogonal frequency division multiplexing (OFDM), CSI in a form of subcarriers is obtained. Establishing a correlation between the CSI obtained by this method and different item materials will improve the accuracy of action judgment.

When the wireless card receives enhanced CSI data, the signal abnormality detection system calculates an average of CSI values of a plurality of subcarriers in a plurality of streams. The system determines that abnormal fluctuation starts when the obtained average exceeds a preset value, and thus transfers data from this time to the following time T to the data feature analysis system. The data feature analysis system analyzes peak number of CSI data, when a peak occurs, frequency at which a peak occurs and CSI average intensity within time T, and uses the obtained data as the target matched data. By combining three machine learning algorithms of KNN, SVM and decision tree for matching the target data with the feature stored in the feature library, it is determined that the data detected within time T is impacted by metal if there is one feature matched with the target data successfully, and an alarm instruction in this case is transmitted to the alarm device.

The abnormality detection system in S4 and the data feature analysis system in S5 may be both placed in an application server. Data received by the wireless card may be transmitted to the application server over network. The alarm system may also be placed in an individual application server. An alarm instruction may be transferred over network or by other media.

The foregoing is merely further detailed description of the present invention with reference to specific preferred embodiments, and it should not be considered that the specific embodiments of the present invention are limited thereto. For a person of ordinary skill in the art to which the present invention pertains, various simple deductions or replacements may be made without departing from the concept of the present invention, and those simple deductions or replacements should be regarded as falling into the protection scope of the present invention.

What is claimed is:
1. A wireless network-based method for detecting the presence of metal, comprising the following steps of:
S1: installing a wireless signal transmitting device and a wireless signal receiving device indoors, the wireless signal receiving device being installed within the coverage of wireless signals transmitted by the wireless signal transmitting device;

S2: continuously transmitting to the surrounding, by the wireless signal transmitting device, wireless electromagnetic wave signals;

S3: continuously receiving, by the wireless signal receiving device, wireless electromagnetic wave signals, the received wireless electromagnetic wave signals comprising wireless electromagnetic wave signals transmitted by the wireless signal transmitting device and wireless electromagnetic wave signals reflected by surrounding walls and indoor items;

S4: continuously performing, by the wireless signal receiving device, a signal abnormity analysis of the received wireless electromagnetic wave signals, wherein the abnormity analysis analyzes channel state information (CSI) of the received wireless electromagnetic wave signals, wherein performing abnormity analysis comprises:

S41: collecting initial channel state information data based on a multi-input multi-output technology, the initial channel state information data comprising CSI data of M subcarriers in N spatial streams, where N and M are natural numbers greater than 1;

S42: for multiple spatial flows, calculating an average of CSI values of N continuous subcarriers at a same time point, and using the average as the channel state information, where N is a natural number greater than 1 and less than M; and S43: determining a signal as one reflected by metal if the channel state information exceeds a preset threshold, setting the channel state information as abnormal information, transferring CSI data of N continuous subcarriers from this abnormal time to the following time T to the data feature analysis system, and if any abnormality is determined after analysis, performing further analysis in S5 of the wireless electromagnetic wave signals within an abnormal waveband;

S5: extracting, by the wireless signal receiving device, a feature value of the wireless electromagnetic wave signals within the abnormal waveband, comparing and matching the feature value with features stored in an abnormal feature library, and if the feature value of the wireless electromagnetic wave signals matches the feature value of metal successfully, triggering an alarm; and S6: transmitting alarm signals to related personnel after the alarm is triggered; and wherein the abnormal feature library is a predetermined signal feature library formed by determining wireless electromagnetic wave signals reflected by abnormal items selected by a user, and signals, generated from reflection of the wireless electromagnetic wave signals by metal items, are defined as wireless electromagnetic wave signals within an abnormal waveband.

2. The method for detecting the presence of metal according to claim 1, wherein there is at least one wireless signal transmitting terminal and at least one wireless receiving terminal; and an angle between a line of the wireless signal transmitting device and an item to be detected and a line of the wireless signal receiving device and the item to be detected is not greater than 180°.

3. The method for detecting the presence of metal according to claim 2, wherein the alarm informs the related personnel by at least one of playing music, flashing, whistling or alerting with text.

4. The method for detecting the presence of metal according to claim 1, wherein, in S5, extracting the feature value comprises performing analysis and extraction of a peak number of the channel state information data, when a peak number occurs, of a frequency at which a peak number occurs and of a CSI average intensity to obtain target matched data of an abnormal feature value.

5. The method for detecting the presence of metal according to claim 4, wherein S5 comprises the following steps of:

S51: analyzing the peak number of the channel state information data, when a peak occurs, the frequency at which a peak number occurs and the CSI average intensity transmitted from S43, and using these data as the target matched data;

S52: establishing a feature model of a training sample, the training sample using an abnormal feature value resulting from changes in the channel state information caused by the presence of different items within a set space as the abnormal feature library;

S53: mapping the target matched data determined in S51 to the feature model of the abnormal feature library established in S52, for separation of a target item to be detected; and S54: transferring an alarm instruction if an expected result is obtained after the match mapping in S53.

6. The method for detecting the presence of metal according to claim 5, wherein a mapping algorithm in S53 combines three strategies of k-nearest neighbors algorithm (KNN), support vector machines (SVM) and decision tree; and wherein it is determined that the wireless electromagnetic wave signals detected within time T are impacted by metal if there is one abnormal feature value matched with the target matched data successfully, and, in this case, an alarm instruction is transmitted.

7. The method for detecting the presence of metal according to claim 1, wherein the alarm informs the related personnel by at least one of playing music, flashing, whistling or alerting with text.

8. A wireless network-based method for detecting the presence of metal, wherein there is at least one wireless signal transmitting terminal and at least one wireless receiving terminal, and an angle between a line of the wireless signal transmitting device and an item to be detected and a line of the wireless signal receiving device and the item to be detected is not greater than 180°, the method comprising the following steps of:

S1: installing a wireless signal transmitting device and a wireless signal receiving device indoors, the wireless signal receiving device being installed within the coverage of wireless signals transmitted by the wireless signal transmitting device;

S2: continuously transmitting to the surrounding, by the wireless signal transmitting device, wireless electromagnetic wave signals;

S3: continuously receiving, by the wireless signal receiving device, wireless electromagnetic wave signals, the received wireless electromagnetic wave signals comprising wireless electromagnetic wave signals transmitted by the wireless signal transmitting device and wireless electromagnetic wave signals reflected by surrounding walls and indoor items;

S4: continuously performing, by the wireless signal receiving device, a signal abnormity analysis of the received wireless electromagnetic wave signals, wherein the abnormity analysis analyzes channel state information (CSI) of the received wireless electromagnetic wave signals, wherein, in S4, performing abnormity analysis of the wireless electromagnetic wave signals comprises the following steps of:

S41: collecting initial channel state information data based on a multi-input multi-output technology, the initial channel state information data comprising CSI data of M subcarriers in N spatial streams, where N and M are natural numbers greater than 1;

S42: for multiple spatial flows, calculating an average of CSI values of N continuous subcarriers at a same time point, and using the average as the channel state information, where N is a natural number greater than 1 and less than M; and S43: determining a signal as one reflected by metal if the channel state information exceeds a preset threshold, setting the channel state information as abnormal information, transferring CSI data of N continuous subcarriers from this abnormal time to the following time T to the data feature analysis system, if any abnormality is determined after analysis, performing further analysis in S5 of the wireless electromagnetic wave signals within an abnormal waveband:

S5: extracting, by the wireless signal receiving device, a feature value of the wireless electromagnetic wave signals within the abnormal waveband, comparing and matching the feature value with features stored in an abnormal feature library, and if the feature value of the wireless electromagnetic wave signals matches the feature value of metal successfully, triggering an alarm; and S6: transmitting alarm signals to related personnel after the alarm is triggered; and wherein the abnormal feature library is a predetermined signal feature library formed by determining wireless electromagnetic wave signals reflected by abnormal items selected by a user, and signals, generated from reflection of the wireless electromagnetic wave signals by metal items, are defined as wireless electromagnetic wave signals within an abnormal waveband;

wherein, in S5, extracting the feature value comprises performing analysis and extraction of a peak number of the channel state information data, when a peak number occurs, of a frequency at which a peak number occurs, and of a CSI average intensity to obtain target matched data of an abnormal feature value.

9. The method for detecting the presence of metal according to claim 8, wherein S5 comprises the following steps of:

S51: analyzing the peak number of the channel state information data, when a peak occurs, the frequency at which a peak number occurs and the CSI average intensity transmitted from S43, and using these data as the target matched data;

S52: establishing a feature model of a training sample, the training sample using an abnormal feature value resulting from changes in the channel state information caused by the presence of different items within a set space as the abnormal feature library;

S53: mapping the target matched data determined in S51 to the feature model of the abnormal feature library established in S52, for separation of a target item to be detected; and S54: transferring an alarm instruction if an expected result is obtained after the match mapping in S53.

10. The method for detecting the presence of metal according to claim 9, wherein a mapping algorithm in S53 combines three strategies of k-nearest neighbors algorithm (KNN), support vector machines (SVM) and decision tree; and wherein it is determined that the wireless electromagnetic wave signals detected within time T are impacted by metal if there is one abnormal feature value matched with the target matched data successfully, and, in this case, an alarm instruction is transmitted.

\* \* \* \* \*